(12) United States Patent
Nishida et al.

(10) Patent No.: US 9,713,940 B2
(45) Date of Patent: Jul. 25, 2017

(54) NON-PNEUMATIC TIRE

(71) Applicant: BRIDGESTONE CORPORATION, Tokyo (JP)

(72) Inventors: Masashi Nishida, Tokyo (JP); Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1 day.

(21) Appl. No.: 14/436,577

(22) PCT Filed: Oct. 22, 2013

(86) PCT No.: PCT/JP2013/078538
§ 371 (c)(1),
(2) Date: Apr. 17, 2015

(87) PCT Pub. No.: WO2014/065263
PCT Pub. Date: May 1, 2014

(65) Prior Publication Data
US 2016/0167434 A1   Jun. 16, 2016

(30) Foreign Application Priority Data

Oct. 22, 2012  (JP) .................................. 2012-232803

(51) Int. Cl.
*B60C 7/14*   (2006.01)
*B60C 7/16*   (2006.01)
(Continued)

(52) U.S. Cl.
CPC ................. *B60C 7/14* (2013.01); *B60B 9/02* (2013.01); *B60B 9/08* (2013.01); *B60B 9/26* (2013.01);
(Continued)

(58) Field of Classification Search
CPC .. B60C 7/14; B60C 7/125; B60C 7/12; B60C 7/16; B60C 9/26; B60C 9/005; B60C 9/02; B60C 2007/146
(Continued)

(56) References Cited

U.S. PATENT DOCUMENTS 1,375,832 A   4/1921  De Baun
1,543,728 A   6/1925  Schulz
(Continued)

FOREIGN PATENT DOCUMENTS

CN    1087311 A    6/1994
CN    1310673 A    8/2001
(Continued)

OTHER PUBLICATIONS

International Standard, "Thermoplastic elastomers—Nomenclature and abbreviated terms", ISO 18064, First Edition, Sep. 1, 2003, 11 pgs.
(Continued)

*Primary Examiner* — S. Joseph Morano
*Assistant Examiner* — Jean Charleston
(74) *Attorney, Agent, or Firm* — Sughrue Mion, PLLC

(57) ABSTRACT

Provided is a non-pneumatic tire including an attachment body attached to an axle, a ring-shaped body (13) configured to surround the attachment body from the outside in the tire radial direction, and a plurality of connecting members disposed between an exterior body (12) and the ring-shaped body (13) in a tire circumferential direction and configured to connect the exterior body (12) and the ring-shaped body (13) in a relatively displaceable manner, wherein, when the tire comes in contact with the ground, the connecting members are deformed by a compressive load in the tire radial direction, and the exterior body (12) and the ring-shaped body (13) are relatively displaced in the tire radial
(Continued)

direction, among the plurality of connecting members, the connecting members disposed between the ground surface (G), with which the tire comes in contact, and the exterior body (12) abut other connecting members neighboring in the tire circumferential direction.

6 Claims, 12 Drawing Sheets

(51) Int. Cl.
*B60B 9/02* (2006.01)
*B60B 9/26* (2006.01)
*B60C 7/18* (2006.01)
*B60B 9/08* (2006.01)

(52) U.S. Cl.
CPC ............... *B60C 7/16* (2013.01); *B60C 7/18* (2013.01); *B60C 2007/146* (2013.04)

(58) Field of Classification Search
USPC ....... 152/246, 112, 323, 324, 326, 300, 301, 152/302
See application file for complete search history.

(56) References Cited

U.S. PATENT DOCUMENTS

| | | | |
|---|---|---|---|
| 3,219,090 A | 11/1965 | Cislo | |
| 5,042,544 A | 8/1991 | Dehasse | |
| 8,646,497 B2* | 2/2014 | Cron | ................ B60C 7/12 |
| | | | 152/12 |
| 8,813,797 B2* | 8/2014 | Anderson | ............... B60C 7/105 |
| | | | 152/11 |
| 2006/0144488 A1 | 7/2006 | Vannan | |
| 2010/0218869 A1* | 9/2010 | Abe | .......................... B60B 9/26 |
| | | | 152/246 |
| 2011/0248554 A1* | 10/2011 | Chon | ....................... B60B 9/02 |
| | | | 301/63.102 |
| 2014/0251518 A1 | 9/2014 | Abe et al. | |

FOREIGN PATENT DOCUMENTS

| | | |
|---|---|---|
| EP | 0051996 A2 | 5/1982 |
| EP | 0399383 A2 | 11/1990 |
| EP | 0561222 A1 | 9/1993 |
| GB | 601764 A | 5/1948 |
| GB | 978913 A | 1/1965 |
| GB | 1292928 A | 10/1972 |
| JP | 58-36702 A | 3/1983 |
| JP | 2005500932 A | 1/2005 |
| JP | 2007-112243 A | 5/2007 |
| JP | 2011-25758 A | 2/2011 |
| JP | 2011-156905 A | 8/2011 |
| JP | 2011-156906 A | 8/2011 |
| WO | 00/78560 A1 | 12/2000 |
| WO | 03018332 A1 | 3/2003 |
| WO | 2007/137858 A2 | 12/2007 |

OTHER PUBLICATIONS

International Search Report for PCT/JP2013/078538 dated Jan. 21, 2014.

* cited by examiner

NON-PNEUMATIC TIRE

TECHNICAL FIELD

The present invention relates to a non-pneumatic tire in which pressurized air need not be filled upon use.

Priority is claimed on Japanese Patent Application No. 2012-232803, filed Oct. 22, 2012, the content of which is incorporated herein by reference.

BACKGROUND ART

In a pneumatic tire of the related art that is filled with pressurized air and used, occurrence of a blowout is a structurally unavoidable problem.

In order to solve this problem, in recent years, for example, a non-pneumatic tire as disclosed in the following Patent Document 1 is proposed.

DOCUMENT OF RELATED ART

Patent Document

[Patent Document 1] Japanese Unexamined Patent Application, First Publication No. 2011-156905

SUMMARY OF INVENTION

Technical Problem

However, in the non-pneumatic tire of the related art, an increase in stiffness with respect to a compressive load in a tire radial direction should be improved more.

In consideration of the above-mentioned circumstances, the present invention is directed to provide a non-pneumatic tire capable of improving stiffness with respect to a compressive load in a tire radial direction.

Solution to Problem

In a non-pneumatic tire of a first aspect according to the present invention, when a compressive load is applied in a tire radial direction in a state in which a tire comes in contact with the ground (hereinafter, simply referred to as a compressed state), since connecting members disposed between a ground surface and an attachment body are configured to abut the other connecting members neighboring in a tire circumferential direction, abutting portions of the connecting members neighboring in the tire circumferential direction can be supported by each other with respect to a compressive load. For this reason, for example, in comparison with a configuration in which the connecting members neighboring in the tire circumferential direction do not abut each other regardless of the compressed state, the stiffness of the connecting member with respect to the compressive load in the tire radial direction, i.e., a spring constant (a longitudinal spring constant) in the tire radial direction of the entire non-pneumatic tire can be increased.

In this case, even when a large load is instantaneously applied to the non-pneumatic tire, for example, damage or plastic deformation of the connecting member can be limited.

In a non-pneumatic tire of a second aspect according to the present invention, in the first aspect, since at least some of the abutting portions of the plurality of connecting members overlap along the ground surface in a side view of the tire, a load applied to the abutting portions (the compressive load in the tire radial direction) can be distributed.

In a non-pneumatic tire of a third aspect according to the present invention, in the first or second aspect, in the plurality of curved sections, since the curved section connected to one end section has a smaller radius of curvature than the curved section disposed closer to the other end section than the curved section, intermediate portions of the plurality of connecting members can be softly deformed. Accordingly, the connecting members neighboring in the tire circumferential direction can more easily abut each other, and the abutting portions can be secured in an elongated state along the ground surface.

In a non-pneumatic tire of a fourth aspect according to the present invention, in any one of the first to third aspects, since a plurality of first connecting plates are disposed in the tire circumferential direction at one positions in the tire width direction and a plurality of second connecting plates are disposed in the tire circumferential direction at the other positions in the tire width direction, in a state in which the compressive load is not applied in the tire radial direction (hereinafter, simply referred to as an idling condition), interference of the connecting plates neighboring in the tire circumferential direction can be limited, and restriction in a disposition number can be limited.

In addition, since one end section of the first connecting plate connected to the ring-shaped body is disposed closer to first side in the tire circumferential direction than the other end section and one end section of the second connecting plate connected to the ring-shaped body is disposed closer to the second side in the tire circumferential direction than the other end section, when an external force is applied to the non-pneumatic tire, the first connecting plate and the second connecting plate can be easily deformed, and flexibility can be provided to the non-pneumatic tire to secure good ride comfort.

In particular, as the first connecting plate and the second connecting plate are easily deformed, since the connecting plates neighboring in the tire circumferential direction easily abut each other, the stiffness of the connecting member can be securely increased.

Moreover, when the attachment body and the ring-shaped body are displaced in the tire radial direction as described above, since the plurality of first connecting plates and the plurality of second connecting plates neighboring in the tire circumferential direction abut each other, the stiffness with respect to the compressive load in the tire radial direction can be securely increased.

In a non-pneumatic tire of a fifth aspect according to the present invention, in any one of the first to fourth aspects, in the first connecting plate and the second connecting plate, a plurality of curved sections curved in the tire circumferential direction may be formed at intermediate portions between the one end sections and the other end sections in a direction in which the connecting plate extends in the side view of the tire.

In this case, in the first connecting plate and the second connecting plate, since the plurality of curved sections are formed in the direction in which the connecting plate extends, a length of the connecting plate is increased to be larger than when the connecting plate is linearly formed. For this reason, the abutting portions of the plurality of first connecting plates and the plurality of second connecting plates are increased in length along the ground surface, or are obtained throughout a plurality of places.

In a non-pneumatic tire of a sixth aspect according to the present invention, in the first aspect, in the side view of the tire in an idling condition, when an angle formed between a line segment AB connecting an outer end A in the tire radial direction the of the connecting member and an inner end B in the tire radial direction and a line segment AO connecting the outer end A in the tire radial direction and the axle O is θ0 (°), a length of a line segment OA is R (mm), a length of a line segment OB is r (mm), θ0=k×(r/R), and an angle formed between the line segment AB and the line segment OB is θ2 (°), k≥40 and θ2≥90° are satisfied.

Here, "a predetermined compressive load" is a load of 1.5 times a load applied to one wheel of the weight of the vehicle on which the tires are mounted.

Further, "an outer end in the tire radial direction of the connecting member" is an end disposed outside in the tire radial direction of both ends in an extension direction of the connecting member, and "an inner end in the tire radial direction of the connecting member" is an end disposed inside in the tire radial direction of both ends in the extension direction of the connecting member.

Accordingly, stiffness with respect to the compressive load in the tire radial direction can be improved while limiting an increase in the weight of the tire.

Effects of the Invention

According to the present invention, stiffness with respect to a compressive load in a tire radial direction can be improved.

DESCRIPTION OF EMBODIMENTS

Hereinafter, an embodiment of a non-pneumatic tire according to the present invention will be described with reference to the accompanying drawings. Further, a non-pneumatic tire 1 of the embodiment may be employed in a compact vehicle or the like that runs at a low speed, for example, a steering wheel type powered wheelchair or the like defined by Japanese Industrial Standard JIS T 9208. In addition, the non-pneumatic tire 1 of the embodiment may be employed at a size of, for example, 3.00-8 or the like.

Figure 1:
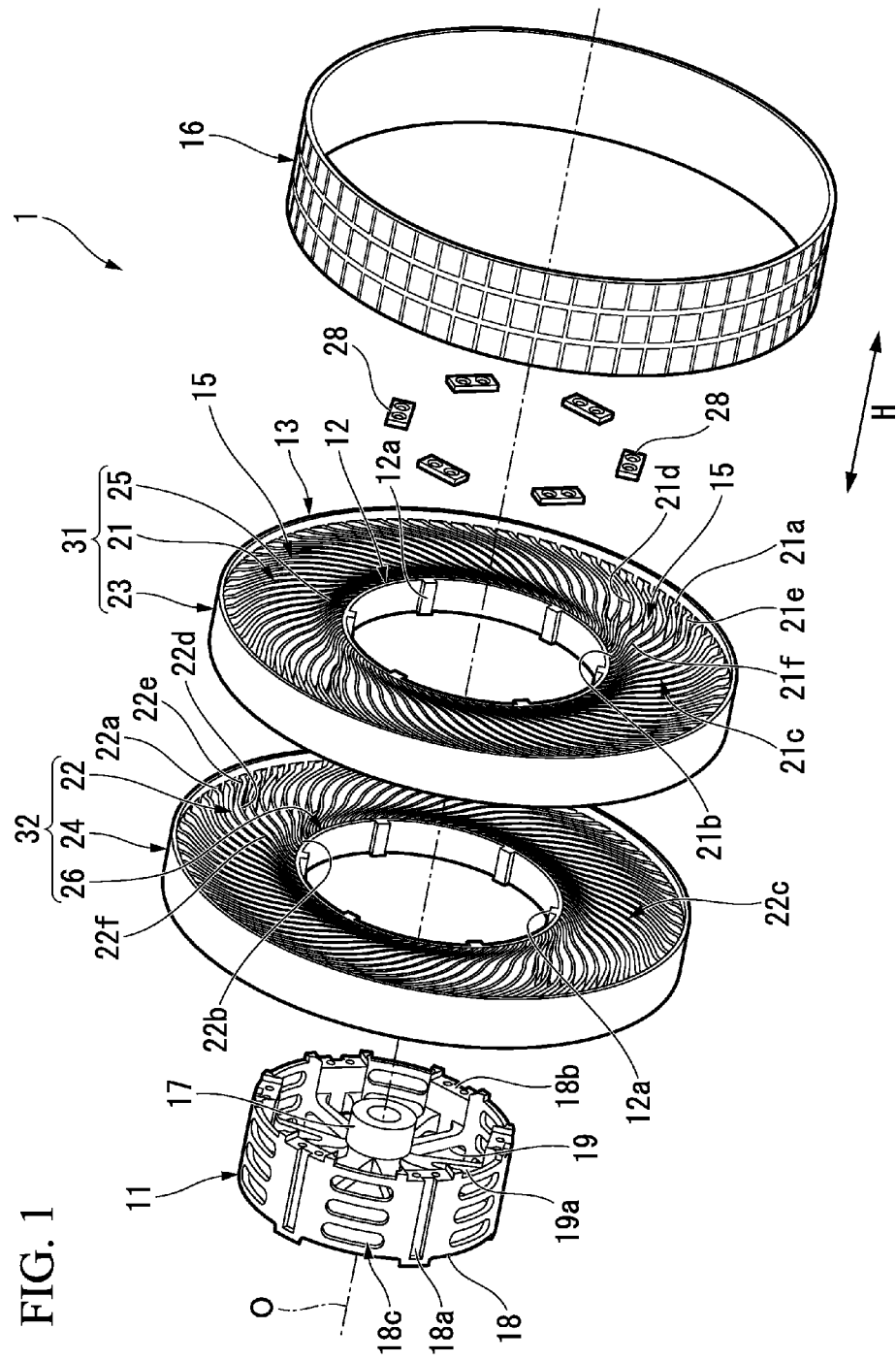
FIG. 1 is a partially exploded schematic perspective view of a non-pneumatic tire of an embodiment according to the present invention.
Figure 2:
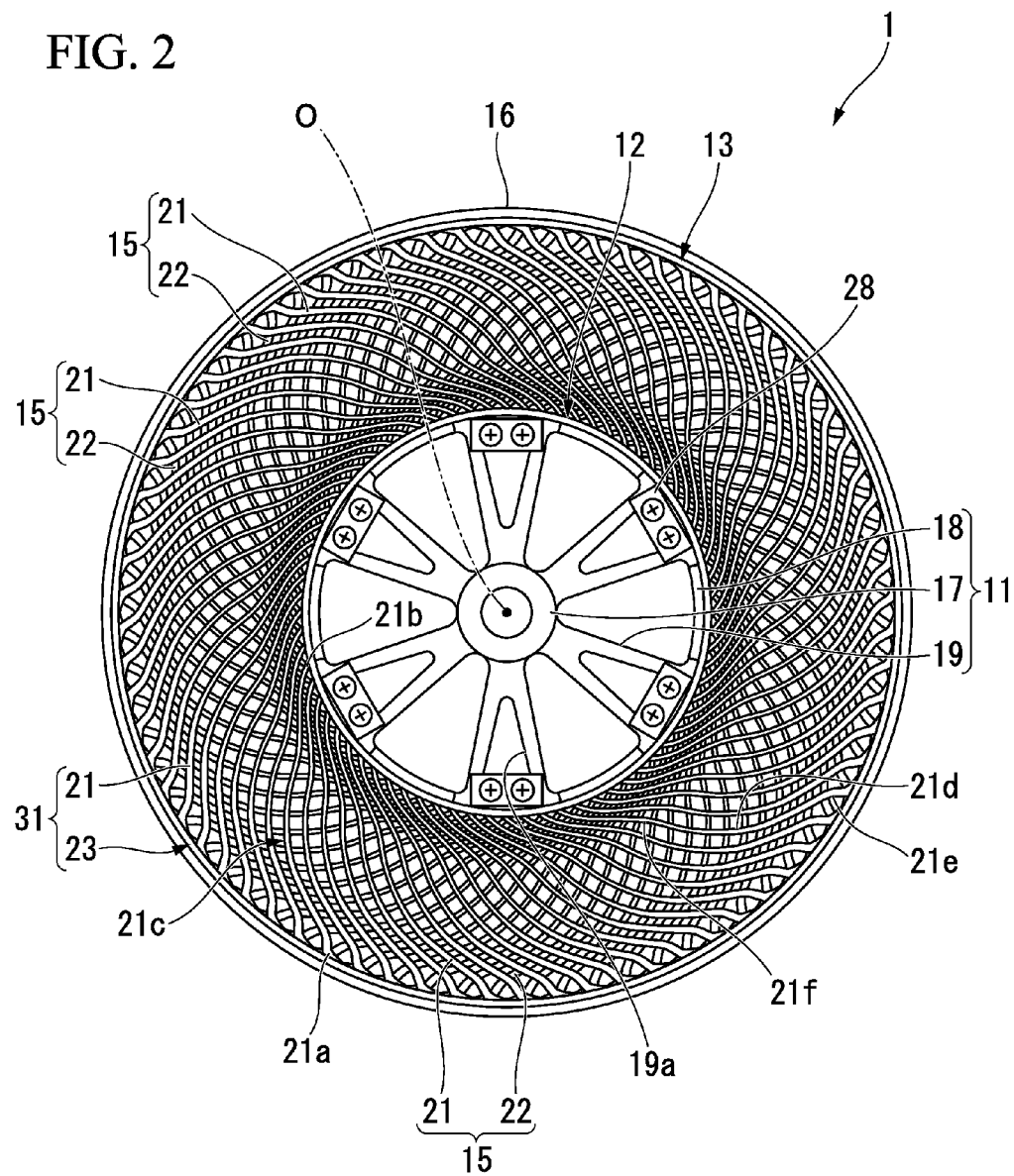
FIG. 2 is a side view of the tire when the non-pneumatic tire shown in FIG. 1 is seen from first side in a tire width direction.

As shown in FIGS. 1 and 2, the non-pneumatic tire 1 of the embodiment includes an attachment body 11 attached to an axle (not shown), a ring-shaped body 13 configured to surround the attachment body 11 from the outside in a tire radial direction, a plurality of connecting members 15 disposed between the attachment body 11 and the ring-shaped body 13 in a tire circumferential direction and configured to connect the attachment body 11 and the ring-shaped body 13 in a relatively elastically displaceable manner, and a tread member 16 disposed at an outer circumferential surface side of the ring-shaped body 13 throughout the entire circumference.

Here, the attachment body 11, the ring-shaped body 13 and the tread member 16 are disposed on the same axis as a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the ring-shaped body 13 and the tread member 16 are disposed such that central sections in the tire width direction H coincide with each other.

The attachment body 11 includes a mounting rim section 17 on which a front end section of the axle is mounted, an outer ring section 18 configured to surround the mounting rim section 17 from the outside in the tire radial direction, and a plurality of ribs 19 configured to connect the mounting rim section 17 and the outer ring section 18.

The mounting rim section 17, the outer ring section 18 and the ribs 19 are integrally formed of a metal material such as an aluminum alloy or the like. The mounting rim section 17 and the outer ring section 18 are formed in a cylindrical shape and disposed on the same axis as the axis O. The plurality of ribs 19 are point-symmetrically disposed with respect to the axis O.

A plurality of key groove sections 18a concaved inward in the tire radial direction and extending in the tire width direction H are formed at an outer circumferential surface of the outer ring section 18 at intervals in the tire circumferential direction. In the outer circumferential surface of the outer ring section 18, the key groove sections 18a are opened at only first side of both ends in the tire width direction H and closed at the second side.

Further, a plurality of hole arrays 18c, in each of which a plurality of weight-reducing holes passing in the tire radial direction are disposed at intervals in the tire width direction H, are formed at a portion of the outer ring section 18 disposed between the key groove sections 18a neighboring in the tire circumferential direction at intervals in the tire circumferential direction. In addition, weight-reducing holes 19a passing in the tire width direction H are also formed in the ribs 19.

In addition, in an edge of first side in the tire width direction H of the outer ring section 18, concave sections 18b concaved toward the second side in the tire width direction H and into which plate members 28 are fitted are formed at positions corresponding to the key groove sections 18a. Through-holes are formed in the plate members 28, and in the wall surfaces that form the concave sections 18b, female screw sections in communication with the through-holes of the plate members 28 fitted into the concave sections 18b are formed in the wall surface facing the first side in the tire width direction H. Further, the plurality of female screw sections and the plurality of through-holes are formed at intervals in the tire circumferential direction.

Then, a cylindrical exterior body 12 is fitted onto the attachment body 11. A plurality of ridge sections 12a protruding inward in the tire radial direction and extending throughout the entire length in the tire width direction H are disposed at an inner circumferential surface of the exterior body 12 at intervals in the tire circumferential direction. The ridge sections 12a are fitted into the key groove sections 18a of the attachment body 11.

The exterior body 12 is fixed to the attachment body 11 as the plate member 28 is fixed into the concave section 18b in a state in which the ridge section 12a is fitted into the key groove section 18a. In this state, the ridge section 12a is sandwiched between the plate member 28 and a bottom wall surface of the concave section 18b in the tire width direction H.

Further, among wall surfaces configured to form the key groove section 18a, a pair of side wall surfaces opposite to each other in the tire circumferential direction are perpendicular to a bottom wall surface. In addition, among outer surfaces of the ridge section 12a, the pair of side wall surfaces standing upward from the inner circumferential surface of the exterior body 12 are perpendicular to a top wall surface directed inward in the tire radial direction. Further, sizes in the tire circumferential direction of the ridge section 12a and the key groove section 18a are equal to each other.

In addition, the ring-shaped body 13 has a larger size, i.e., width, in the tire width direction H than the exterior body 12, and in the example shown, the ring-shaped body 13 is formed in a cylindrical shape.

The connecting member 15 connects an outer circumferential surface side of the attachment body 11 and an inner circumferential surface side of the ring-shaped body 13, and in the example shown, the connecting member 15 includes a first connecting plate 21 and a second connecting plate 22, which are elastically deformable, configured to connect an outer circumferential surface of the exterior body 12 and an inner circumferential surface of the ring-shaped body 13.

In the connecting member 15, the plurality of first connecting plates 21 are disposed in the tire circumferential direction at one position in the tire width direction H (first side in the tire width direction H), and the plurality of second connecting plates 22 are disposed in the tire circumferential direction at the other position in the tire width direction H (the second side in the tire width direction H) different from the one position in the tire width direction H. That is, the plurality of first connecting plates 21 are disposed in the tire circumferential direction at the same position in the tire width direction H, and the plurality of second connecting plates 22 are disposed in the tire circumferential direction at the same position in the tire width direction H spaced apart from the first connecting plate 21 in the tire width direction H. Further, in the example shown, 60 of each of the connecting plates 21 and 22 are installed in the tire circumferential direction.

Further, the plurality of connecting members 15 are disposed between the exterior body 12 and the ring-shaped body 13 at positions point-symmetrical with respect to the axis O. In addition, all the connecting members 15 have the same shape and the same size. Further, the width of the connecting member 15 is smaller than the width of the ring-shaped body 13.

Then, in a state in which a compressive load is not applied in the tire radial direction (hereinafter, simply referred to as an idling condition), the first connecting plates 21 neighboring in the tire circumferential direction do not come in contact with each other. Similarly, the second connecting plates 22 neighboring in the tire circumferential direction do not come in contact with each other in the idling condition. Further, the first connecting plates 21 and the second connecting plates 22 neighboring in the tire width direction H do not come in contact with each other.

Further, widths of the first connecting plate 21 and the second connecting plate 22 are equal to each other.

In addition, thicknesses of the first connecting plate 21 and the second connecting plate 22 are equal to each other.

Figure 3:
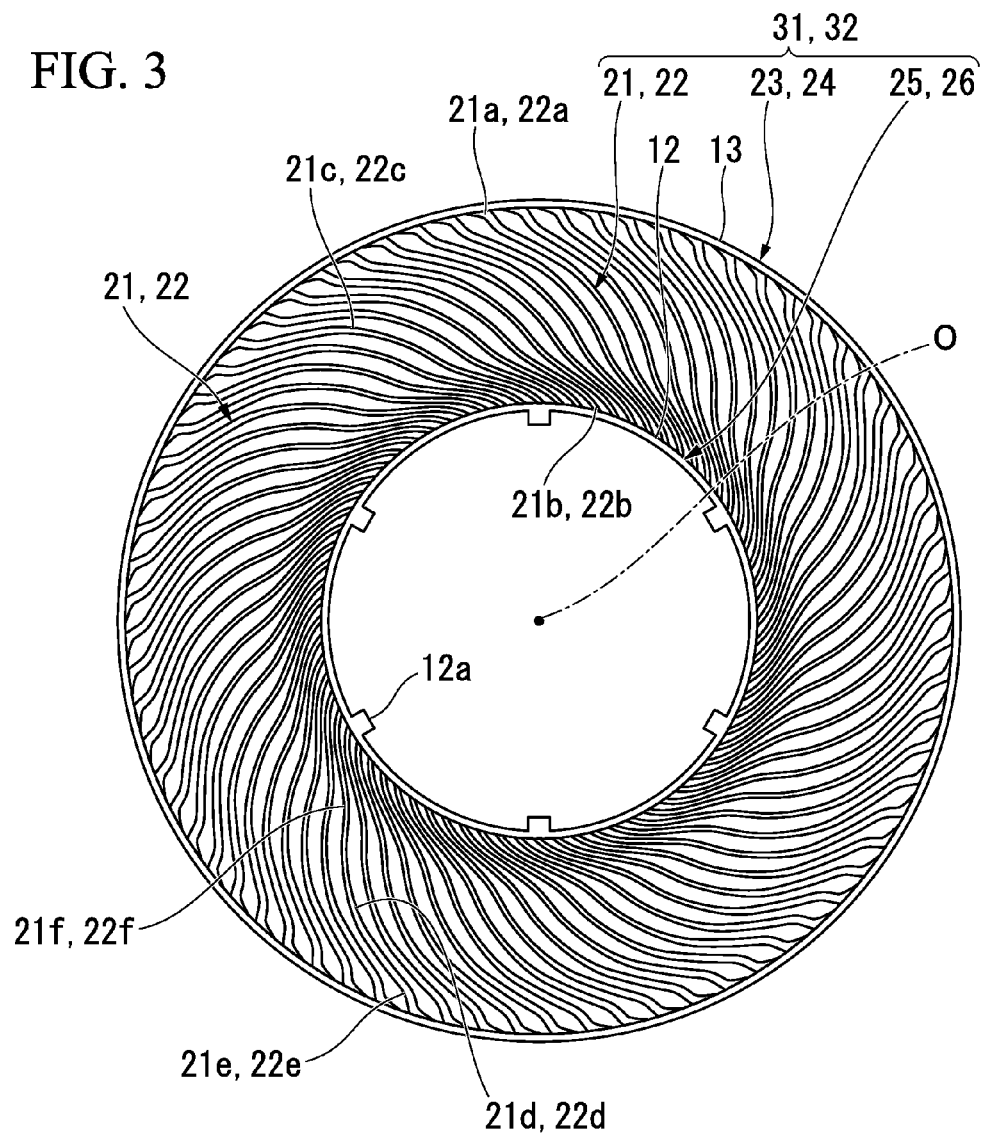
FIG. 3 is a plan view when a first split case body of the non-pneumatic tire shown in FIG. 1 is seen from first side in the tire width direction, or a plan view when a second split case body is seen from the second side in the tire width direction.
Figure 4:
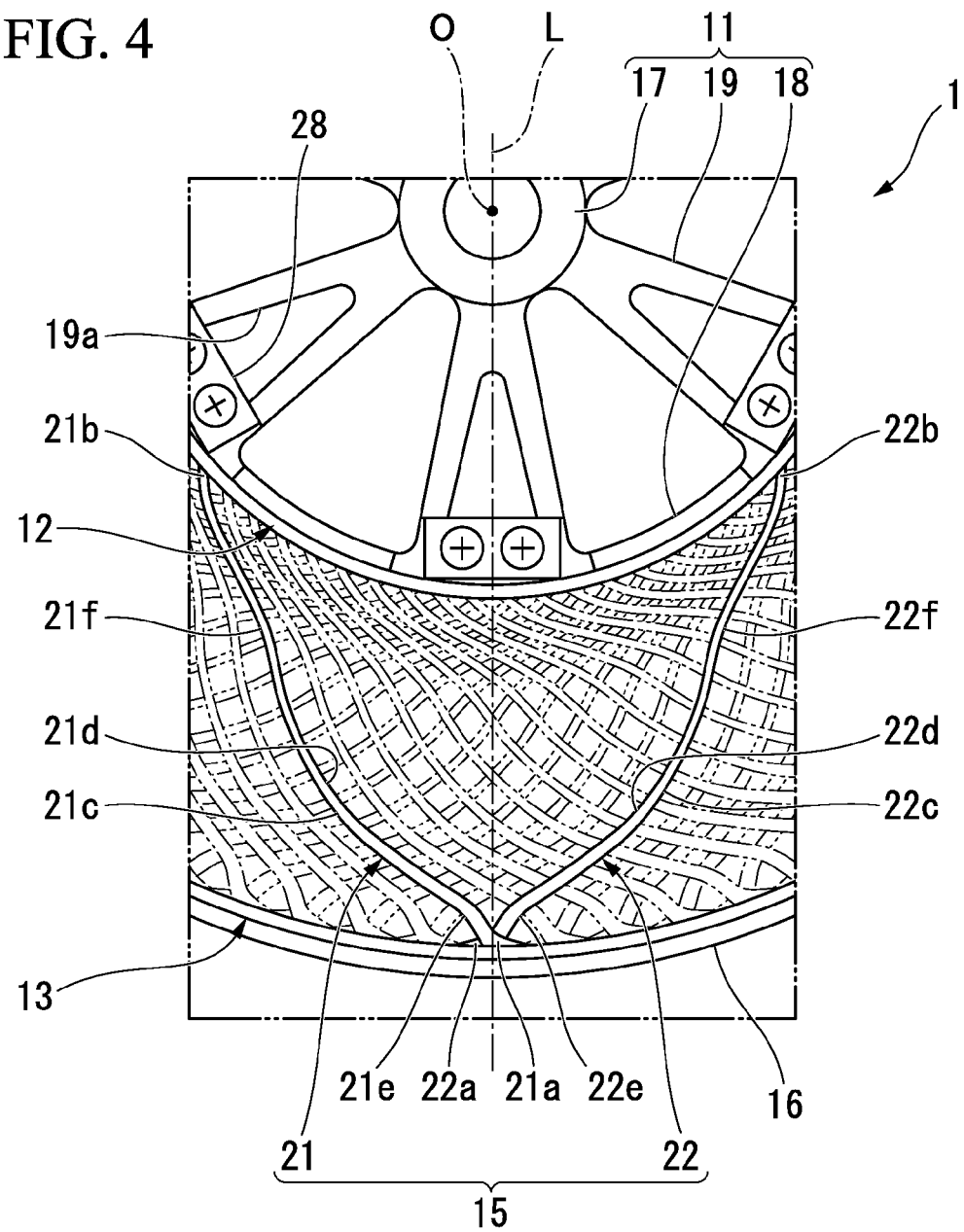
FIG. 4 is an enlarged view showing a major part of FIG. 2 in an idling condition.

Here, as shown in FIGS. 2 to 4, one end section 21a of the first connecting plate 21 connected to the ring-shaped body 13 is disposed closer to first side in the tire circumferential direction than the other end section 21b connected to the exterior body 12, and one end section 22a of the second connecting plate 22 connected to the ring-shaped body 13 is disposed closer to the second side in the tire circumferential direction than the other end section 22b connected to the exterior body 12.

In addition, the one end sections 21a and 22a of the first connecting plate 21 and the second connecting plate 22 of the one connecting member 15 are disposed at different positions in the tire width direction H and connected at the same position in the tire circumferential direction in the inner circumferential surface of the ring-shaped body 13.

In addition, shapes of the first connecting plate 21 and the second connecting plate 22 in the vicinity of the attachment body 11 and the exterior body 12 are standing types with respect to a ground surface G. In addition, shapes of the first connecting plate 21 and the second connecting plate 22 configured to connect the attachment body 11 and the exterior body 12 are curved to be inclined in a radial direction.

In the example shown, in the first connecting plate 21 and the second connecting plate 22, a plurality of curved sections 21d to 21f and 22d to 22f curved in the tire circumferential direction are formed at intermediate portions 21c and 22c disposed between the one end sections 21a and 22a and the other end sections 21b and 22b in a direction in which the connecting plates 21 and 22 extend, in a side view of the tire when the non-pneumatic tire 1 is seen from the tire width direction H. In both of the connecting plates 21 and 22, curve directions of the curved sections 21d to 21f and 22d to 22f neighboring in the above-mentioned extending direction in the plurality of curved sections 21d to 21f and 22d to 22f are opposite to each other.

The plurality of curved sections 21d to 21f formed at the first connecting plate 21 have the first curved section 21d curved to protrude toward the second side in the tire circumferential direction, the second curved section 21e disposed between the first curved section 21d and the one end section 21a, joined to the one end section 21a and curved to protrude toward first side in the tire circumferential direction, and the third curved section 21f disposed between the first curved section 21d and the other end section 21b and curved to protrude toward first side in the tire circumferential direction.

In addition, the plurality of curved sections 22d to 22f formed at the second connecting plate 22 have the first curved section 22d curved to protrude toward first side in the tire circumferential direction, the second curved section 22e disposed between the first curved section 22d and the one end section 22a, joined to the one end section 22a and curved to protrude toward the second side in the tire circumferential direction, and the third curved section 22f disposed between the first curved section 22d and the other end section 22b, and curved to protrude toward the second side in the tire circumferential direction.

In the example shown, the first curved sections 21d and 22d have a larger radius of curvature when seen in the side view of the tire than the second curved sections 21e and 22e and the third curved sections 21f and 22f. In particular, in the example shown, in the curved sections 21d to 21f and 22d to 22f of the connecting plates 21 and 22, radii of curvature of the second curved sections 21e and 22e joined to the one end sections 21a and 22a are minimized. Further, the first curved sections 21d and 22d are disposed at central sections in a direction in which the first connecting plate 21 and the second connecting plate 22 extend.

Further, lengths of both of the connecting plates 21 and 22 are equal to each other, and as shown in FIG. 4, the other end sections 21b and 22b of both of the connecting plates 21 and 22 are connected to first side and the second side in the tire circumferential direction about the axis O at positions spaced apart from positions in the tire radial direction opposite to the one end sections 21a and 22a in the outer circumferential surface of the exterior body 12 at the same angle interval (for example, 20° to 135°) when seen in the side view of the tire. In addition, the first curved sections 21d and 22d, the second curved sections 21e and 22e and the third curved sections 21f and 22f of the first connecting plate 21 and the second connecting plate 22 protrude to face each other in the tire circumferential direction and have the same size.

Accordingly, a shape of each of the connecting members 15 when seen in the side view of the tire extends in the tire radial direction, and is line symmetrical with respect to an imaginary line L passing the one end sections 21a and 22a of both of the connecting plates 21 and 22.

In addition, in both of the connecting plates 21 and 22, one end side portions formed from a central section to the one end sections 21a and 22a in a direction in which the connecting plates 21 and 22 extend have a larger thickness than the other end side portions formed from the central section to the other end sections 21b and 22b. Accordingly, strength of the one end sections 21a and 22a side at which a large load in the connecting plates 21 and 22 is applied can be increased while limiting an increase in weight of the connecting member 15 and securing flexibility of the connecting member 15. Further, the one end side portions and the other end side portion are smoothly joined to each other with no step.

Here, in the embodiment, the exterior body 12, the ring-shaped body 13 and the plurality of connecting member 15 are integrally formed with each other.

Further, in the embodiment, as shown in FIG. 1, the exterior body 12 is split into first side split exterior body 25 disposed at first side in the tire width direction H and the second side split exterior body 26 disposed at the second side in the tire width direction H. In addition, the ring-shaped body 13 is split into first side split ring-shaped body 23 disposed at first side in the tire width direction H and the second side split ring-shaped body 24 disposed at the second side in the tire width direction H. Further, in the example shown, the exterior body 12 and the ring-shaped body 13 are split at the central section in the tire width direction H.

Then, the first side split exterior body 25 and the first side split ring-shaped body 23 are integrally formed with the first connecting plate 21, and the second side split exterior body 26 and the second side split ring-shaped body 24 are integrally formed with the second connecting plate 22.

Further, in the embodiment, the first side split exterior body 25, the first side split ring-shaped body 23 and the first connecting plate 21, and the second side split exterior body 26, the second side split ring-shaped body 24 and the second connecting plate 22 are respectively integrally formed by casting or injection molding.

Hereinafter, a member obtained by integrally forming the first side split exterior body 25, the first side split ring-shaped body 23 and the first connecting plate 21 is referred to as a first split case body 31, and a member obtained by integrally forming the second side split exterior body 26, the second side split ring-shaped body 24 and the second connecting plate 22 is referred to as a second split case body 32.

Here, the injection molding may be a general method of simultaneously forming both of the entire first and second split case bodies 31 and 32, and in the split case bodies 31 and 32, some of the split exterior bodies 25 and 26, the one and the other split ring members 23 and 24 and the first and second elastic connecting plates 21 and 22 may be an insert product, and the other may be an insert molding product formed through injection molding, so-called two color formation, or the like.

In addition, in the split case bodies 31 and 32, the split exterior bodies 25 and 26, the split ring-shaped bodies 23 and 24, and the connecting plates 21 and 22 may be formed of different materials, or may be formed of the same material. Further, the material may be a metal material, a resin material, or the like, and may be preferably a resin material, in particular, a thermoplastic resin in view of reduction in weight.

In addition, when both of the entire split case bodies 31 and 32 are simultaneously injection-molded, the plurality of ridge section 12a formed at the exterior body 12 may be a gate portion.

In the split case bodies 31 and 32, a central section in the tire width direction H of the connecting plates 21 and 22, a central section in the tire width direction H of the ring-shaped body 13, and a central section in the tire width direction H of the exterior body 12 coincide with each other. In addition, the exterior body 12 has a smaller width than the ring-shaped body 13, and the same width as the first connecting plate 21 and the second connecting plate 22.

Then, edges in the tire width direction H of the split ring-shaped bodies 23 and 24 are connected by, for example, welding, fusion, adhesion, or the like. Further, among these, in the case of the welding, hot plate welding or the like may be employed.

In addition, edges in the tire width direction H of the split exterior bodies 25 and 26 are separated from each other in the tire width direction H. Accordingly, generation of burrs on the inner circumferential surface of the exterior body 12 fitted onto the attachment body 11 is prevented.

In addition, the split case bodies 31 and 32 have the same shape and the same size as shown in FIG. 3 in a state before the bodies 31 and 32 are connected as described above.

Then, when the split case bodies 31 and 32 are connected as described above, the edges in the tire width direction H of the ring-shaped bodies 13 of the split case bodies 31 and 32 match to be connected to each other in a state in which directions in the tire width direction H of both of the split case bodies 31 and 32 are opposite to each other while matching the positions in the tire circumferential direction of the split case bodies 31 and 32 such that the connecting members 15 are line-symmetrical to each other as described above when seen in the side view of the tire.

The tread member 16 is formed in a cylindrical shape, integrally covers the outer circumferential surface of the ring-shaped body 13 throughout the entire region, and in the example shown, the inner circumferential surface of the tread member 16 is closely adhered to the outer circumferential surface of the ring-shaped body 13 throughout the entire region. The tread member 16 is formed of, for example, natural rubber or/and vulcanized rubber in which a rubber composition is vulcanized, a thermoplastic material, or the like. For example, a thermoplastic elastomer, a thermoplastic resin, or the like is provided as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), or another thermoplastic elastomer (TPZ) or the like, defined by Japanese Industrial Standards JIS K6418, is provided as the thermoplastic elastomer. For example, a urethane resin, an olefin resin, a polyvinyl chloride resin, a polyamide resin, or the like, is provided as the thermoplastic resin. Further, in view of an abrasion resistance property, the tread member 16 may be formed of the vulcanized rubber.

Figure 5:
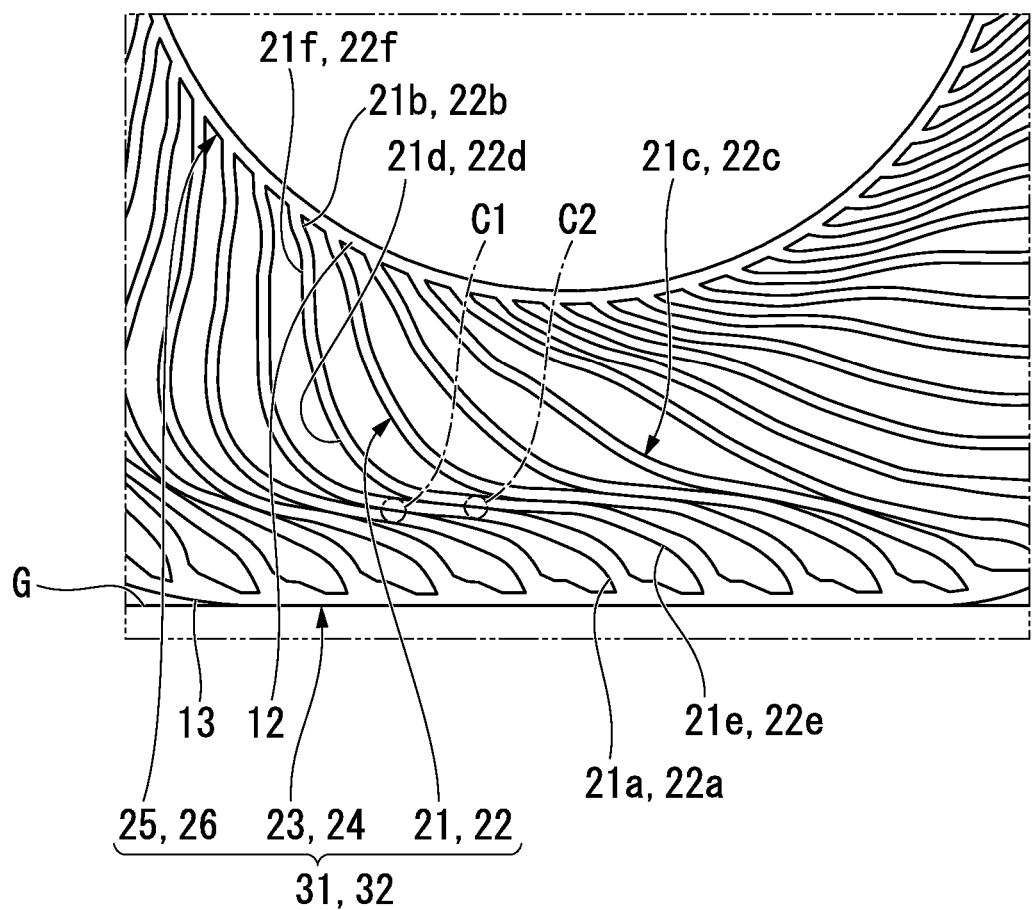
FIG. 5 is an enlarged view showing a major part of FIG. 3 in a compressed state.

In the non-pneumatic tire 1 having the above-mentioned configuration, as shown in FIG. 5, when a compressive load is applied in the tire radial direction in a state in which it is grounded to the ground surface G (hereinafter, simply referred to as the compressed state), as the connecting member 15 is elastically deformed, the attachment body 11 (the exterior body 12) and the ring-shaped body 13 are relatively displaced in the tire radial direction. Here, among the connecting members 15, the connecting members 15 disposed between the ground surface G to which the non-pneumatic tire 1 is grounded and the exterior body 12 and neighboring in the tire circumferential direction have surfaces facing in the tire circumferential direction and abutting each other.

Figure 7:
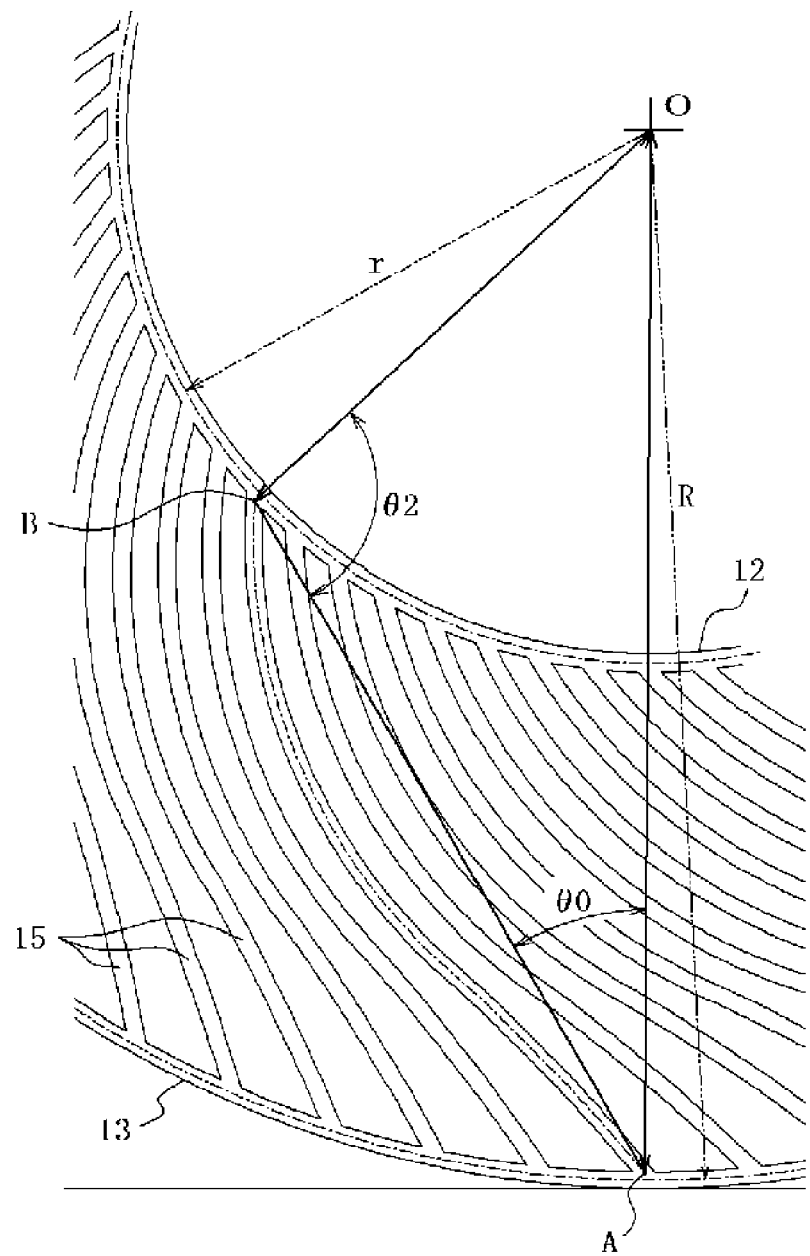
FIG. 7 is a partial side view of the non-pneumatic tire according to the embodiment of the present invention.

In addition, as shown in FIG. 7, in the side view of the tire in the idling condition, an angle formed between a line segment AB connecting an outer end A in the tire radial direction (an end of one end section) of the connecting member 15 to an inner end B in the tire radial direction (an end of the other end section) and a line segment AO connecting the outer end A in the tire radial direction to an axle O is $\theta 0$ (°).

In addition, a length of a line segment OA (in the example shown, a radius of the inner circumferential surface of the ring-shaped body 13 about the axle O) is R (mm), and a length of a line segment OB (in the example shown, the radius of the outer circumferential surface of the exterior body 12 about the axle O) is r (mm).

Further, when $\theta 0 = k \times (r/R)$ and an angle formed by the line segment AB and the line segment OB is $\theta 2$ (°), in the non-pneumatic tire of the present invention, $k \geq 40$ and $\theta 2 \geq 90°$ may be satisfied.

In the connecting member 15, the first connecting plate 21 disposed between the ground surface G and the exterior body 12 is deformed from the one end section 21a toward the other end section 21b to be collapsed toward the second side in the tire circumferential direction, and the first connecting plates 21 neighboring in the tire circumferential direction come in contact with each other to overlap in the tire radial direction.

Here, in the one first connecting plate 21, the other first connecting plates 21 (the other connecting member) neighboring in the tire circumferential direction with respect to the one first connecting plate 21 come in contact with different portions in the direction in which the one first connecting plate 21 extends (different portions in the tire circumferential direction) in the side view of the tire when the non-pneumatic tire 1 is seen from the tire width direction H. Specifically, a contact portion (an abutting portion) C1 between the other first connecting plate 21 adjacent to the second side in the tire circumferential direction with respect to the one first connecting plate 21 and the one first connecting plate 21 is disposed closer to the other end section 21b in the one first connecting plate 21 than a contact portion (an abutting portion) C2 between the other first connecting plate 21 adjacent to first side in the tire circumferential direction and the one first connecting plate 21. Further, the other first connecting plates 21 include the first connecting plates 21 disposed at both sides in the tire circumferential direction with respect to the one first connecting plate 21.

In addition, in the connecting member 15, the second connecting plate 22 disposed between the ground surface G and the exterior body 12 is deformed from the one end section 22a toward the other end section 22b to collapse toward first side in the tire circumferential direction, and come in contact with the second connecting plates 22 neighboring in the tire circumferential direction to overlap in the tire radial direction. Accordingly, deformation directions of the connecting plates 21 and 22 are opposite to each other in the tire circumferential direction.

In addition, in the one second connecting plate 22, the other second connecting plates 22 (the other connecting members) adjacent to both sides in the tire circumferential direction with respect to the one second connecting plate 22 come in contact with different portions in the direction in which the one second connecting plate 22 extends (different portions in the tire circumferential direction) in the side view of the tire. Specifically, the contact portion C1 between the other second connecting plates 22 adjacent to the first side in the tire circumferential direction with respect to the one second connecting plate 22 and the one second connecting plate 22 is disposed closer to the other end section 22b in the one second connecting plate 22 than the contact portion C1 between the other second connecting plate 22 adjacent to the first side in the tire circumferential direction and the one second connecting plate 22.

Then, in the connecting plates 21 and 22, the plurality of first connecting plates 21 and the plurality of second connecting plates 22 neighboring in the tire circumferential direction abut each other, and the contact portions C1 and C2 overlap along the ground surface G in the side view of the tire. That is, the contact portions C1 and C2 are parallel to join each other along the ground surface G in the side view of the tire. Further, in the embodiment, the contact portions C1 of the plurality of first connecting plates 21 neighboring in the tire circumferential direction and the contact portion C2 of the second connecting plate 22 may be disposed on the same position in the tire radial direction. In addition, in the contact portions of the connecting plates 21 and 22 disposed between the ground surface G and the attachment body 11, all the contact portions may overlap along the ground surface G in the side view of the tire, or only some of the contact portions may overlap.

As described above, according to the non-pneumatic tire 1 of the embodiment, in the compressed state, since the connecting members 15 disposed between the ground surface G and the attachment body 11 (the exterior body 12) and neighboring in the tire circumferential direction are configured to abut each other, the contact portions C1 and C2 of the connecting members 15 neighboring in the tire circumferential direction can support each other with respect to the compressive load. For this reason, for example, in comparison with the configuration in which the connecting members 15 neighboring in the tire circumferential direction do not come in contact with each other regardless of the compressed state, the stiffness of the connecting member 15 with respect to the compressive load in the tire radial direction, i.e., s a spring constant (a longitudinal spring constant) in the tire radial direction of the entire non-pneumatic tire 1, can be increased.

In this case, even when an instantaneous large load is applied to the non-pneumatic tire 1, for example, damage, plastic deformation, or the like, of the connecting member 15 can be limited.

Further, since the plurality of first connecting plates 21 are disposed in the tire circumferential direction at positions in the one tire width direction H and the plurality of second connecting plates 22 are disposed in the tire circumferential direction at positions in the other tire width direction H, interference between the connecting members 15 neighboring in the tire circumferential direction in the idling condition can be limited, and restriction in disposition number can be limited.

In addition, since the one end section 21a of the first connecting plate 21 connected to the ring-shaped body 13 is disposed closer to the first side in the tire circumferential direction than the other end section 21b connected to the exterior body 12 and the one end section 22a of the second connecting plate 22 connected to the ring-shaped body 13 is disposed closer to the second side in the tire circumferential direction than the other end section 22b connected to the exterior body 12, when the external force is applied to the non-pneumatic tire 1, the first connecting plate 21 and the second connecting plate 22 can be easily elastically deformed, and flexibility can be provided to the non-pneumatic tire 1 to secure good ride comfort.

In particular, as the first connecting plate 21 and the second connecting plate 22 can be easily elastically deformed, since the connecting plates 21 and 22 neighboring in the tire circumferential direction can easily abut each other, the stiffness of the connecting member 15 can be securely increased.

Moreover, in the embodiment, when the exterior body 12 and the ring-shaped body 13 are relatively displaced in the tire radial direction as described above, since the plurality of first connecting plates 21 and the plurality of second connecting plates 22 neighboring in the tire circumferential direction abut each other, the stiffness with respect to the compressive load in the tire radial direction can be securely increased.

Further, since the contact portions C1 and C2 between the plurality of first connecting plates 21 and the plurality of second connecting plates 22 join each other along the ground surface G in the side view of the tire, a load applied to the contact portions C1 and C2 (a compressive load in the tire radial direction) can be distributed.

In addition, in the first connecting plate 21 and the second connecting plate 22, since the plurality of curved sections 21d to 21f and 22d to 22f are formed in the direction in which the connecting plates 21 and 22 extend, the lengths of the connecting plates 21 and 22 are larger than when the plates are linearly formed. For this reason, the contact portions C1 and C2 between the plurality of first connecting plate 21 and the plurality of second connecting plates 22 are elongated along the ground surface G or can be easily secured throughout the plurality of places.

In addition, since the second curved sections 21e and 22e have a smaller radius of curvature than the first curved sections 21d and 22d and the third curved sections 21f and 22f, the intermediate portions 21c and 22c of the first connecting plate 21 and the second connecting plate 22 can be softly deformed. Accordingly, the connecting plates 21 and 22 neighboring in the tire circumferential direction can easily abut each other, and the abutting portions C1 and C2 can be secured in the elongated state along the ground surface G.

In addition, since the connecting member 15 is line-symmetrically formed with respect to the imaginary line L in the side view of the tire, a difference between a spring constant along first side in the tire circumferential direction and a spring constant along the second side in the non-pneumatic tire 1 can be limited, and good controllability can be provided.

Further, in the embodiment, since the exterior body 12, the ring-shaped body 13 and the plurality of connecting members 15 are integrally formed with each other, when the non-pneumatic tire 1 is assembled, even when both end sections of the plurality of connecting members 15 are connected to the exterior body 12 and the ring-shaped body 13, since it is sufficient if the end sections are mounted on the attachment body 11 in a state in which the ring-shaped body 13 and the plurality of connecting members 15 are integrally formed with each other, manufacturing time can be reduced.

In addition, since the ring-shaped body 13 and the plurality of connecting members 15 are integrally formed with each other, for example, an increase in weight can be limited in comparison with the case in which both end sections of the connecting member 15, the exterior body 12 and the ring-shaped body 13 are connected using a fastening member or the like.

Further, in the embodiment, when the attachment body 11 and the ring-shaped body 13 are relatively displaced in the tire radial direction by 5% of an outer diameter (a tire height) of the non-pneumatic tire 1, the connecting members 15 disposed between the ground surface G and the exterior body 12 and neighboring in the tire circumferential direction may be configured to abut each other. Accordingly, the stiffness can be increased while securing flexibility of the connecting member 15.

Here, the inventor(s) has performed a verification test of an effect as described above.

As Example 1, the non-pneumatic tire 1 shown in FIGS. 1 to 5 was employed, and as Comparative Example 1, the non-pneumatic tire in which the connecting members 15 neighboring in the tire circumferential direction were configured not to come in contact with each other in the compressed state was employed. Then, in the test, in Example 1 and Comparative Example 1, a relation between a bend rate (%: a displacement rate with respect to an outer diameter) and a load (N) was measured. Further, the sizes (for example, 3.00-8) of the tires were the same.

Figure 6:
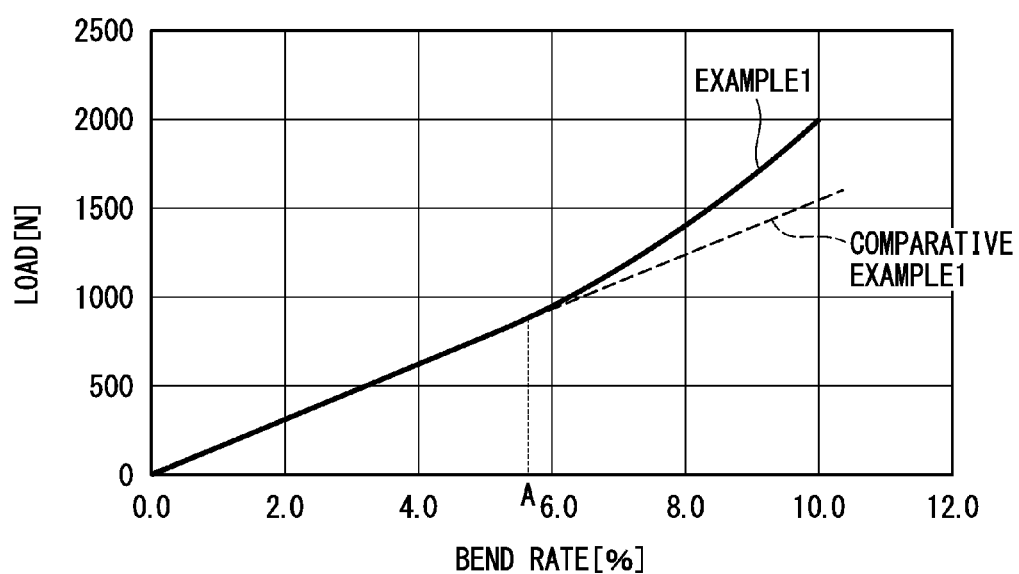
FIG. 6 is a graph showing a relation between a bend rate (%) and a load (N).

In a graph of FIG. 6, it is shown that the load increased as the bend rate increased in both Example 1 and Comparative Example 1. Specifically, in the case of Comparative Example 1, it was seen that the load increased at a constant rate according to an increase in bend rate, and the bend rate and the load had a substantially proportional relation.

Meanwhile, in the case of Example 1, in a range in which the bend rate was less than 5 to 6% (a point A of FIG. 6), like Comparative Example 1, the bend rate and the load had a proportional relation, and in a range in which the bend rate was at the point A or higher, the rate of increase of the load with respect to the bend rate increased in comparison with the range below the point A.

In the range below the point A, when the compressive load was applied in the tire radial direction, as the connecting members 15 neighboring in the tire circumferential direction were elastically deformed in the non-contact state, the attachment body 11 and the ring-shaped body 13 were relatively displaced in the tire radial direction in both Example 1 and Comparative Example 1.

Then, in the case of Comparative Example 1, even in the range of the point A or higher, as the connecting members 15 neighboring in the tire circumferential direction were elastically deformed in the non-contact state, the load increased at a constant rate according to an increase in bend rate.

Meanwhile, in the case of Example 1, stiffness in the range of the point A or higher is considered to be improved at the point A because the connecting members 15 neighboring in the tire circumferential direction abut each other.

Further, a rate of increase of the load with respect to the increase in bend rate is considered to gradually increase in the range of the point A or higher because the contact portions C1 and C2 of the connecting members 15 are easily secured in the elongated state along the ground surface G or throughout the plurality of places according to an increase in bend rate. Further, as a result of the test, it was confirmed that, when a longitudinal spring constant of Comparative Example 1 at a bend rate of 10% is 100, a longitudinal spring constant of Example 1 is 170.

In addition, the inventor(s) discovered that, when k≥40 and θ2≥90° are satisfied, stiffness with respect to the compressive load in the tire radial direction can be effectively improved.

First, when θ2 is less than 90°, since an interval between the connecting members 15 is reduced and slightly bent to cause contact between the connecting members 15, and a path of the connecting members 15 is increased, a tire weight is increased. As a shape of the connecting members 15 is restricted from this, first, it is important that θ2 be 90° or more.

Next, FIG. 7 is a view showing a relation between θ0 (°), the stress and the weight of the tire having a tire size 155/65 R13 (PS), 3.00-8 and 4.00-5.

Further, stress generated at the connecting member when a vehicle load was loaded was calculated by FEM analysis.

Figure 8:
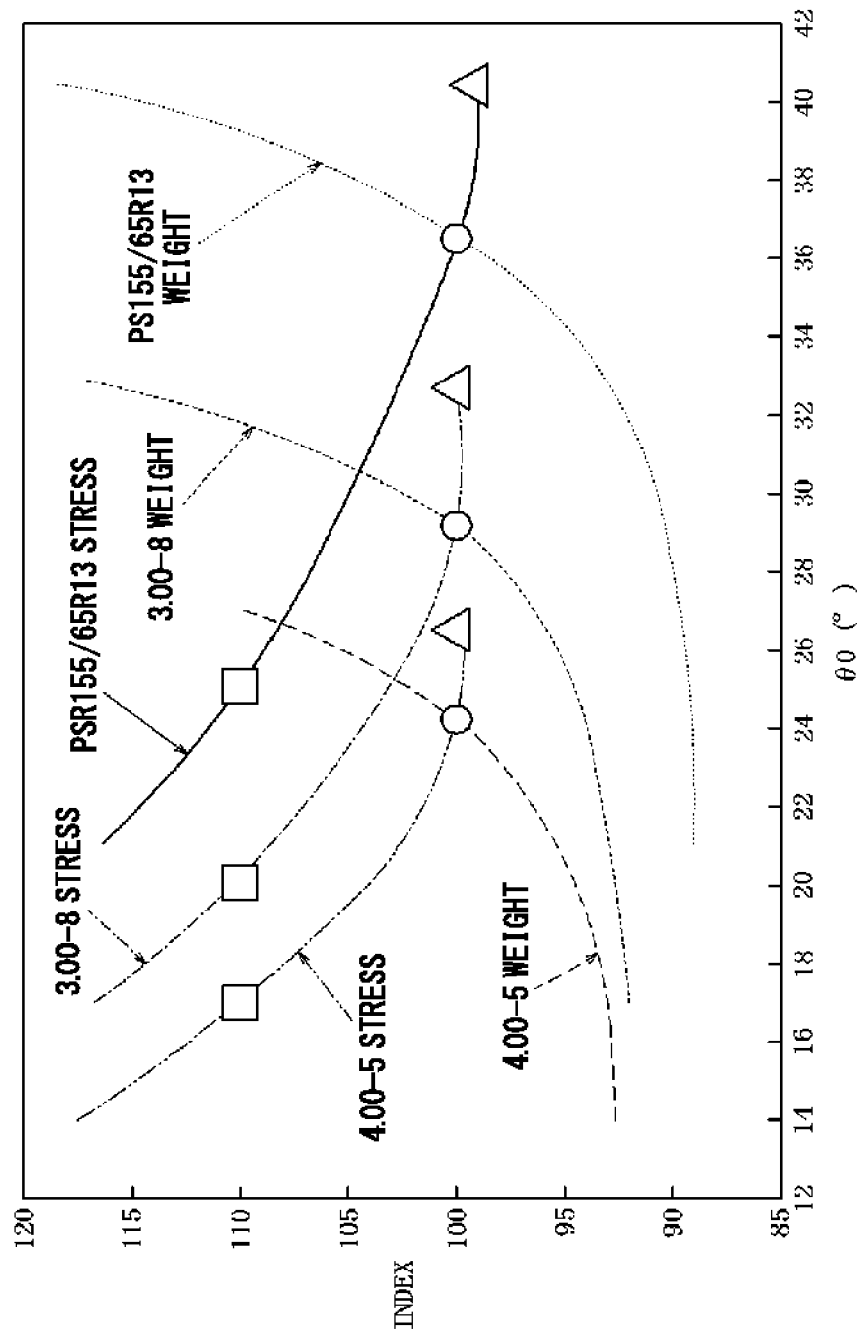
FIG. 8 is a graph showing a relation between θ0, stress and weight.

In FIG. 8, triangles correspond to the case in which θ=90° (an upper limit value of k in the definition), a longitudinal axis represents INDEX when stress and weight are set as 100 at a point in the tire with a tire size of 3.00-8, and the stress and weight increase as a numerical value is increased.

Further, the stress to INDEX 110 indicates that the tire has sufficient strength, and in the drawing, is represented as rectangles. These points mean a lower limit value of k in the definition.

In addition, as an example of appropriate values, intersection points between the graph of the stress and the graph of the weight are represented as circles.

Figure 9:
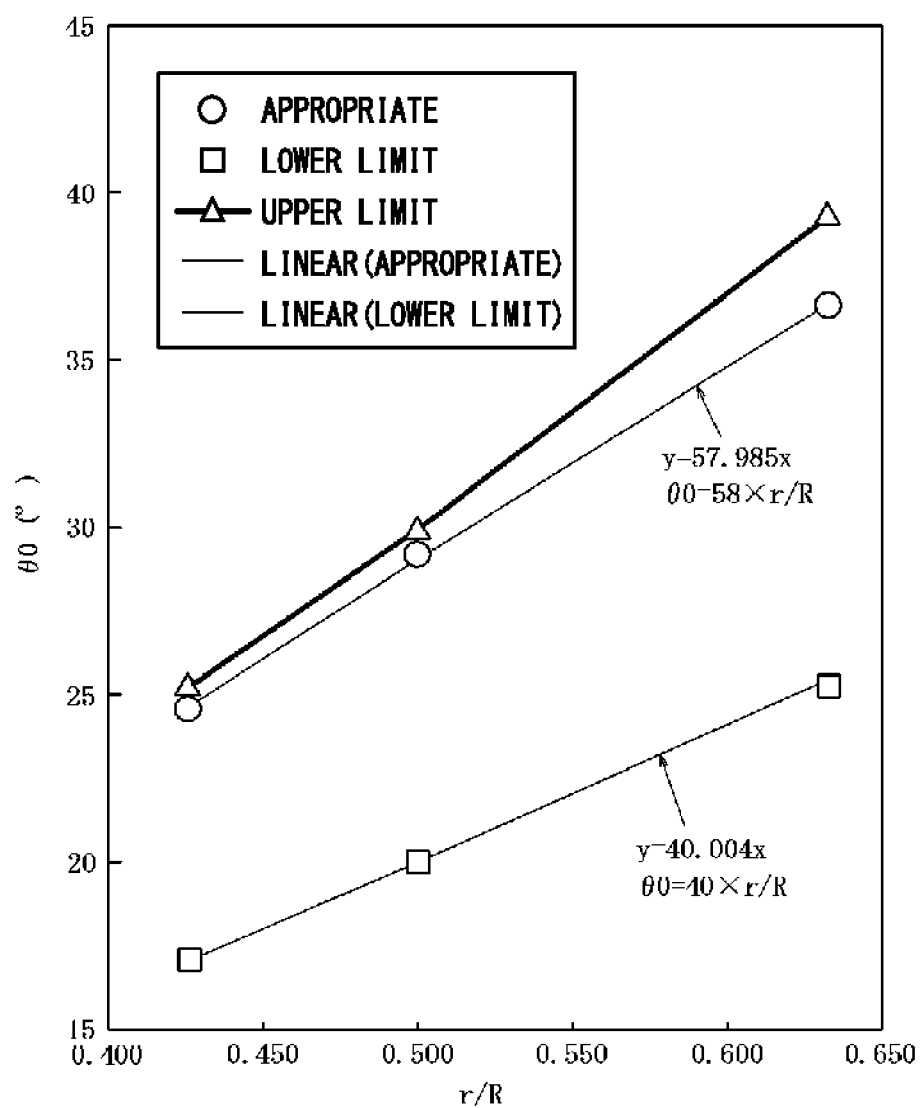
FIG. 9 is a graph showing a relation a ratio of r/R and θ0.

Next, FIG. 9 is a view of the triangles, rectangles and circles of FIG. 8 showing a relation between a ratio r/R and θ0 with respect to the tires of three tire sizes.

It is shown in FIG. 9 that it is important to form the connecting member with a value of k of 40 or more in order to restrict the shape of the connecting member 15.

According to the above-mentioned consideration, it can be seen that, as k≥40 and θ2≥90° are satisfied, improvement of stiffness with respect to the compressive load in the tire radial direction and limitation of an increase in weight are compatible.

Accordingly, according to the tire of the embodiment, the stiffness with respect to the compressive load in the tire radial direction can be improved while limiting an increase in weight.

Figure 10:
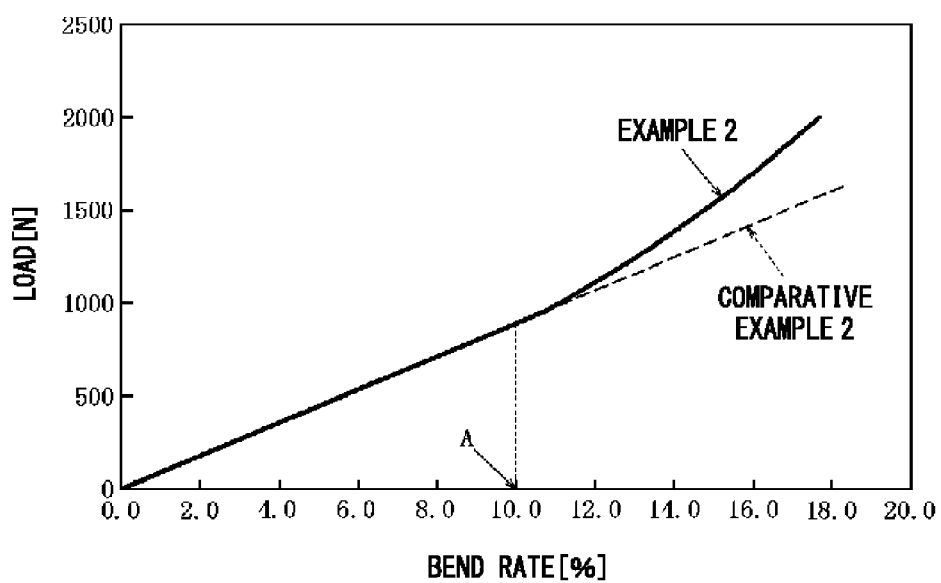
FIG. 10 is a graph showing a relation between a bend rate (%) and a load (N).

It can be seen from a graph of FIG. 10 that the load also increased as the bend rate increased in both Example 2 and Comparative Example 2. Specifically, in the case of Comparative Example 2, it can be seen that the load increased at a constant rate according to an increase in bend rate, and the bend rate and the load had a substantially proportional relation.

Meanwhile, in the case of Example 2, in the range in which the bend rate was less than about 10% (the point A of FIG. 10), like Comparative Example 2, the bend rate and the load had a proportional relation, and in the range in which the bend rate was at the point A or higher, a rate of increase of the load with respect to the bend rate increased in comparison with the range below the point A.

Further, the technical spirit of the present invention is not limited to this embodiment but various modifications may be made without departing from the spirit of the present invention.

For example, the curve direction of the curved sections 21d to 21f in the first connecting plate 21 and the curve direction of the curved sections 22d to 22f in the second connecting plate 22 may be appropriately varied without being limited to the above-mentioned embodiment.

In addition, in the above-mentioned embodiment, while a configuration in which the first connecting plate 21 and the second connecting plate 22 are disposed in two rows in the tire width direction H as the connecting member 15 has been described, the present invention is not limited thereto but the connecting members 15 may be disposed in the tire width direction H in a plurality of rows, i.e., three or more rows, or one row.

In addition, the plurality of connecting members 15 may be installed between the exterior body 12 and the ring-shaped body 13 in the tire width direction H.

In addition, instead of the above-mentioned embodiment, for example, the other end sections 21b and 22b of the first connecting plate 21 and the second connecting plate 22 may be connected at opposite positions with the axis O sandwiched therebetween on the outer circumferential surface of the exterior body 12 in the tire radial direction, or may be connected to the one end sections 21a and 22a of the first connecting plate 21 and the second connecting plate 22 at opposite positions in the tire radial direction on the outer circumferential surface of the exterior body 12.

In addition, instead of the above-mentioned embodiment, the one end sections 21a and 22a of both of the connecting plates 21 and 22 may be connected at different positions in the tire circumferential direction on the inner circumferential surface of the ring-shaped body 13.

Further, a gap in the tire width direction H may be formed between the first side split exterior body 25 and the second side split exterior body 26.

In addition, the exterior body 12 and the ring-shaped body 13 may be split into three or more parts in the tire width direction H, or may not be split.

Further, the first and second split case bodies 31 and 32 are not limited to the above-mentioned embodiment but may be formed through, for example, cutting or the like.

In addition, in the above-mentioned embodiment, while the exterior body 12, the ring-shaped body 13 and the plurality of connecting members 15 are integrally formed with each other, the present invention is not limited thereto but these may be connected to each other after being formed separately. Further, the exterior body 12 may be integrally formed with the attachment body 11.

In addition, in the above-mentioned embodiment, while the configuration in which the one end sections 21a and 22a of the connecting members 15 are indirectly connected to the attachment body 11 via the exterior body 12 has been described, the present invention is not limited thereto but the one end sections 21a and 22a of the connecting members 15 may be directly connected to the attachment body 11.

In addition, although the contact portions C1 and C2 of the plurality of first connecting plates 21 and the contact portions C1 and C2 of the plurality of second connecting plates 22 neighboring in the tire circumferential direction are disposed in the tire radial direction in the same manner as in the above-described embodiment, the present invention is not limited thereto.

In addition, the components of the above-mentioned embodiment may be appropriately substituted with known components without departing from the spirit of the present invention, or the above-mentioned variants may be appropriately combined.

In order to verify advantageous effects of the present invention, tires according to Examples 3 to 5 and tires according to Comparative Examples 3 and 4 were experimentally manufactured, and the following tests of estimating weight, stress, and a contact between the connecting member upon loading of a load were performed.

The tires were tires with tire sizes of 3.00-8.

Here, "stress" generated in the connecting member when a vehicle load is loaded was calculated through FEM analysis.

Specifications and estimation results of the tires show that, as shown in the following Table 1, the weight and stress were estimated as an index when an estimation result of Example 3 was 100, and examples having larger numerical values had larger weight and stress. In addition, "Contact between connecting members upon loading" refers to whether the connecting members came in unintentional contact with each other when a slight load of 0.7 kN was loaded.

It can be seen from Table 1 that, in comparison with the tires according to Comparative Examples 3 and 4, in the tires according to Examples 3 to 5, stress can be reduced while limiting an increase in weight.

INDUSTRIAL APPLICABILITY

Stiffness with respect to a compressive load in a tire radial direction can be improved.

DESCRIPTION OF REFERENCE SIGNS

1 non-pneumatic tire
11 attachment body
12 exterior body
13 ring-shaped body
15 connecting member
21 first connecting plate
22 second connecting plate
21a, 22a one end section
21b, 22b other end section
21d to 21f, 22d to 22f curved section
G ground surface
H tire width direction
O axis

The invention claimed is:

1. A non-pneumatic tire comprising:
an attachment body attached to an axle;
a ring-shaped body configured to surround the attachment body from the outside in a tire radial direction; and
a plurality of connecting members disposed between the attachment body and the ring-shaped body in a tire circumferential direction and configured to displaceably connect the attachment body and the ring-shaped body,
wherein, when the tire comes in contact with the ground, the connecting members are deformed by a compressive load in the tire radial direction, and the attachment body and the ring-shaped body are deformed in the tire radial direction, among the plurality of connecting members, the connecting members disposed between the ground surface with which the tire comes in contact and the attachment body abut other connecting members neighboring in the tire circumferential direction, and a plurality of connecting members neighboring in the tire circumferential direction in the plurality of connecting members abut each other in the tire radial direction and at least some of the abutting portions

TABLE 1

Figure 11A:
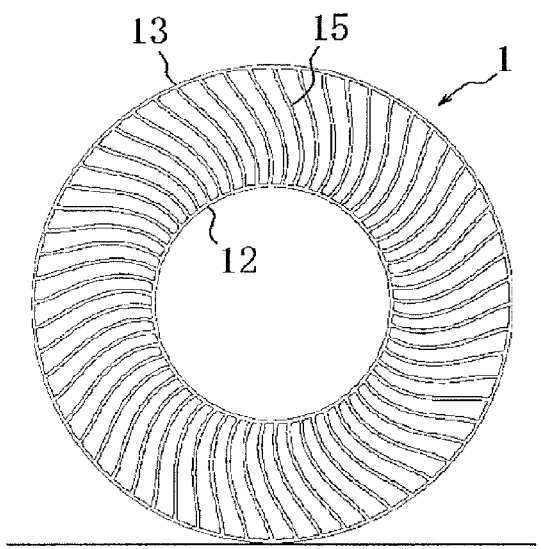
FIG. 11A is a side view of a non-pneumatic tire according to Comparative Example 3.
Figure 11B:
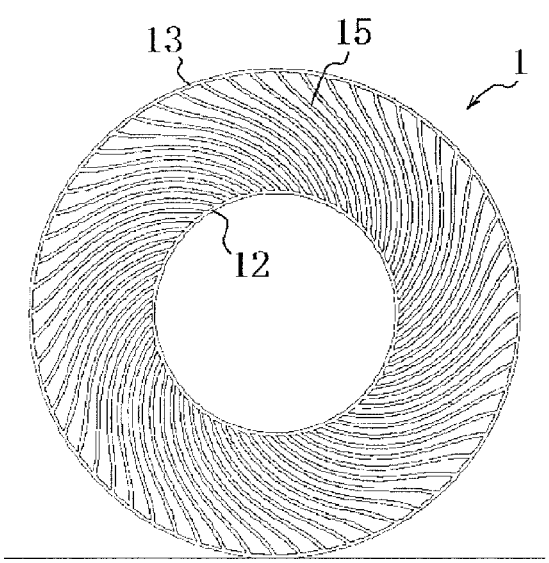
FIG. 11B is a side view of a non-pneumatic tire according to Inventive Example 3.
Figure 11C:
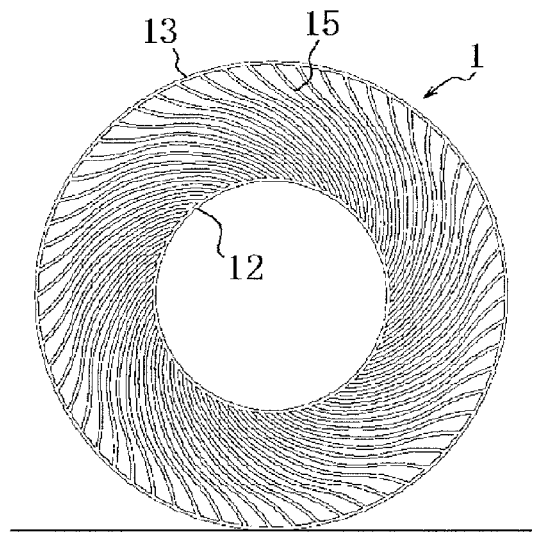
FIG. 11C is a side view of a non-pneumatic tire according to Inventive Example 4.
Figure 11D:
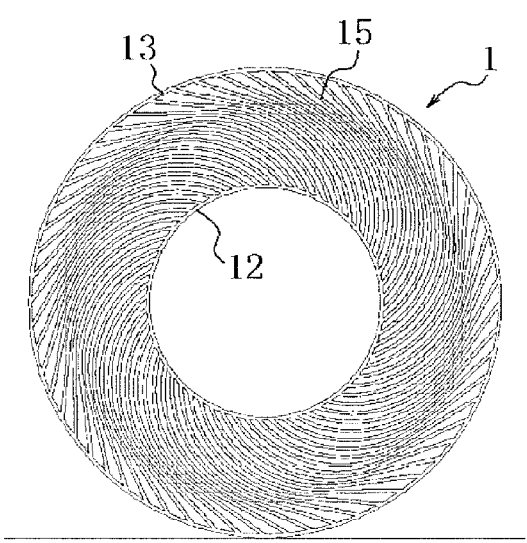
FIG. 11D is a side view of a non-pneumatic tire according to Comparative Example 4.

|  | Example 3 | Example 4 | Example 5 | Comparative Example 3 | Comparative Example 4 |
|---|---|---|---|---|---|
| FIG. | FIG. 11B | FIG. 11C | — | FIG. 11A | FIG. 11D |
| k | 58 | 60 | 40 | 34 | 59.1 |
| θ0 (°) | 28.9 | 29.9 | 20.0 | 17.0 | 29.5 |
| θ2 (°) | 104.2 | 90.0 | 136.8 | 144.2 | 80.5 |
| Weight (INDEX) | 100 | 102 | 93 | 92 | 110 |
| Stress (INDEX) | 100 | 99 | 110 | 117 | 100 |
| Contact between connecting members upon loading | No | No | No | No | Yes | overlap along the ground surface in a side view of the tire when the tire is seen from a tire width direction and in the side view of the tire in an idling condition, when an angle formed between a line segment AB connecting an outer end A in the tire radial direction the of the connecting member and an inner end B in the tire radial direction and a line segment AO connecting the outer end A in the tire radial direction and the axle O is θ0 (°), a length of a line segment OA is R (mm), a length of a line segment OB is r (mm), θ0=k×(r/R), and an angle formed between the line segment AB and the line segment OB is θ2 (°), k≥40 and θ2≥90° are satisfied.

2. The non-pneumatic tire according to claim 1, wherein, in the connecting members, a plurality of curved sections curved in the tire circumferential direction are formed at intermediate portions disposed between one end sections connected to the ring-shaped body and other end sections connected to the attachment body in a direction in which the connecting member extends in the side view of the tire when the tire is seen from the tire width direction, and among the plurality of curved sections, the curved sections joined to the one end sections have a smaller radius of curvature than the curved sections disposed closer to the other end sections.

3. The non-pneumatic tire according to claim 2, wherein the connecting member comprises a first connecting plate and a second connecting plate configured to connect the attachment body and the ring-shaped body, one end section of the first connecting plate connected to the ring-shaped body is disposed closer to first side in the tire circumferential direction than another end section connected to the attachment body, one end section of the second connecting plate connected to the ring-shaped body is disposed closer to another side in the tire circumferential direction than the other end section connected to the attachment body, the plurality of first connecting plates are disposed in the tire circumferential direction at one positions in the tire width direction, and the plurality of second connecting plates are disposed in the tire circumferential direction at other positions in the tire width direction different from the one positions in the tire width direction, and when the tire comes in contact with the ground, the connecting members are deformed by the compressive load in the tire radial direction, and the attachment body and the ring-shaped body are deformed in the tire radial direction, the plurality of first connecting plates and the plurality of second connecting plates neighboring in the tire circumferential direction abut each other.

4. The non-pneumatic tire according to claim 3, wherein, in the first connecting plate and the second connecting plate, a plurality of curved sections curved in the tire circumferential direction are formed at intermediate portions between the one end sections and the other end sections in a direction in which the connecting plate extends in the side view of the tire.

5. The non-pneumatic tire according to claim 1, wherein the connecting member comprises a first connecting plate and a second connecting plate configured to connect the attachment body and the ring-shaped body, one end section of the first connecting plate connected to the ring-shaped body is disposed closer to first side in the tire circumferential direction than another end section connected to the attachment body, one end section of the second connecting plate connected to the ring-shaped body is disposed closer to a second side in the tire circumferential direction than the other end section connected to the attachment body, the plurality of first connecting plates are disposed in the tire circumferential direction at one positions in the tire width direction, and the plurality of second connecting plates are disposed in the tire circumferential direction at other positions in the tire width direction different from the one positions in the tire width direction, and when the tire comes in contact with the ground, the connecting members are deformed by the compressive load in the tire radial direction, and the attachment body and the ring-shaped body are deformed in the tire radial direction, the plurality of first connecting plates and the plurality of second connecting plates neighboring in the tire circumferential direction abut each other.

6. The non-pneumatic tire according to claim 5, wherein, in the first connecting plate and the second connecting plate, a plurality of curved sections curved in the tire circumferential direction are formed at intermediate portions between the one end sections and the other end sections in a direction in which the connecting plate extends in the side view of the tire.

* * * * *